United States Patent
Luo et al.

(10) Patent No.: US 11,722,987 B2
(45) Date of Patent: Aug. 8, 2023

(54) COMMUNICATION METHOD, COMMUNICATIONS DEVICE, AND COMMUNICATIONS SYSTEM

(71) Applicant: HUAWEI TECHNOLOGIES CO., LTD., Guangdong (CN)

(72) Inventors: Haiyan Luo, Shanghai (CN); Rui Wang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/925,817

(22) Filed: Jul. 10, 2020

(65) Prior Publication Data
US 2020/0344719 A1    Oct. 29, 2020

Related U.S. Application Data

(63) Continuation of application No. PCT/CN2019/071162, filed on Jan. 10, 2019.

(30) Foreign Application Priority Data

Jan. 12, 2018 (CN) .......................... 201810030917.4

(51) Int. Cl.
 *H04W 68/02* (2009.01)
(52) U.S. Cl.
 CPC .................................. *H04W 68/02* (2013.01)
(58) Field of Classification Search
 CPC ...................................................... H04W 68/02
 USPC ......................................................... 455/458
 See application file for complete search history.

(56) References Cited

U.S. PATENT DOCUMENTS

| 5,473,612 A * | 12/1995 | Dehner, Jr. ........... H04L 1/0083 370/514 |
| 2006/0040681 A1 * | 2/2006 | Julka .................... H04W 68/02 455/458 |
| 2011/0171929 A1 * | 7/2011 | Tamura ................. H04W 48/12 455/404.1 |

(Continued)

FOREIGN PATENT DOCUMENTS

| CN | 105144809 A | 12/2015 |
| CN | 106162730 A | 11/2016 |

(Continued)

OTHER PUBLICATIONS

3GPP TS 36.413 V14.4.0 (Sep. 2017), "3rd Generation Partnership Project;Technical Specification Group Radio Access Network; Evolved Universal Terrestrial Radio Access Network (E-UTRAN); S1 Application Protocol (S1AP)(Release 14)," Sep. 2017, 353 pages.

(Continued)

*Primary Examiner* — Joel Ajayi
(74) *Attorney, Agent, or Firm* — Fish & Richardson P.C.

(57) ABSTRACT

A communication method relates to a paging mechanism applied for a radio access network, including: a centralized unit sends a paging message to a distributed unit, where the paging message carries indication information indicates that the paging is paging originated from a core network or the paging is paging originated from a radio access network; and the distributed unit determines, according to the indication information, that the paging is paging originated from the core network or the paging is paging originated from the radio access network.

8 Claims, 6 Drawing Sheets

(56) References Cited

U.S. PATENT DOCUMENTS

| | | | | |
|---|---|---|---|---|
| 2013/0331054 A1* | 12/2013 | Kodali | ............. | H04W 68/02 |
| | | | | 455/404.1 |
| 2013/0331057 A1* | 12/2013 | Kodali | ............. | H04W 76/18 |
| | | | | 455/450 |
| 2017/0325282 A1 | 11/2017 | Hong et al. | | |

FOREIGN PATENT DOCUMENTS

| | | |
|---|---|---|
| CN | 109391963 A | 2/2019 |
| RU | 2491787 C2 | 8/2013 |
| WO | 2017166963 A1 | 10/2017 |

OTHER PUBLICATIONS

3GPP TS 38.473 V1.0.0 (Dec. 2017), "3rd Generation Partnership Project;Technical Specification Group Radio Access Network; NG-RAN;F1 application protocol (F1AP)(Release 15)," Dec. 2017, 92 pages.
3GPP TS 38.331 V15.0.0 (Dec. 2017), "3rd Generation Partnership Project;Technical Specification Group Radio Access Network NR Radio Resource Control (RRC) protocol specification (Release 15)," Dec. 2017, 188 pages.
3GPP TS 36.300 V15.0.0 (Dec. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Dec. 2017, 338 pages.
Ericsson et al., "E1 functions," 3GPP TSG RAN WG3 Meeting #98, Tdoc R3-175032, Reno, Nevada, USA, Nov. 27-Dec. 1, 2017, 2 pages.
Ericsson, "Further considerations on RAN and CN paging in Inactive," 3GPP TSG-RAN WG2 #97, Tdoc R2-1700893, Athens, Greece, Feb. 13-17, 2017, 5 pages.
Samsung et al., "User inactivity monitoring in CU-DU architecture," 3GPP TSG RAN WG3 Meeting #98, R3-174460, Reno, USA, Nov. 27-Dec. 1, 2017, 4 pages.
Ericsson, "Monitoring of inactivity," 3GPP TSG RAN WG3 Meeting #98 Tdoc, R3-174788, Reno, Nevada, USA, Nov. 27-Dec. 1, 2017, 5 pages.
Huawei, "Further discussions on Paging over F1," 3GPP TSG-RAN3 Meeting # 98, R3-174480, Reno, Nevada, US Nov. 27-Dec. 1, 2017, 4 pages.
Huawei, "F1AP procedures for RRC Connection Setup," 3GPP TSG-RAN3 NR AdHoc, R3-172176, Qingdao, China, Jun. 27-29, 2017, 3 pages.
Huawei, "Paging delivery over F1," 3GPP TSG RAN WG3 meeting #97, R3-173102, Berlin, Germany, Aug. 21-25, 2017, 3 pages.
Huawei, "Rapporteur editorial updates to 38.473," 3GPP TSG-RAN3 Meeting #98, R3-174704, Reno, Nevada, US, Nov. 27-Dec. 1, 2017, 4 pages.
PCT International Search Report and Written Opinion issued in International Application No. PCT/CN2019/071162 dated Apr. 10, 2019, 20 pages (with English translation).
Huawei, "Paging transfer over F1," 3GPP TSG RAN WG3 meeting #97bis, R3-173730, Prague, Czech, Oct. 9-13, 2017, 5 pages.
Ericsson, "Paging in RRC_INACTIVE," 3GPP TSG-RAN WG2 NR AH#3, R2-1800361, Vancouver, Canada, Jan. 22-26, 2018, 3 pages.
Office Action issued in Chinese Application No. 201810030917.4 dated Mar. 1, 2021, 11 pages.
Huawei et al., "RRC state transition from Inactive to Idle," 3GPP TSG-RAN WG2 NR Adhoc#2 Meeting, R2-1706725, Qingdao, China, Jun. 27-29, 2017, 3 pages.
Office Action issued in Australian Application No. 2019207029 dated Mar. 29, 2021, 6 pages.
Ericsson, "Further considerations on RAN and CN paging in Inactive," 3GPP TSG RAN WG2 #98, R2-1704123, Hangzhou, China, May 15-19, 2017, 6 pages.
Office Action issued in Korean Application No. 2020-7022800 dated Apr. 28, 2021, 8 pages (with English translation).
Huawei, HiSilicon, "RAN initiated Paging," 3GPP TSG-RAN WG2 #100, R2-1713932, Reno, Nevada, USA, Nov. 27-Dec. 1, 2017, 3 pages.
Intel Corporation, "RAN-initiated paging details," 3GPP TSG RAN WG2 Meeting #100, R2-1712671, Reno, USA, Nov. 27-Dec. 1, 2017, 5 pages.
Office Action issued in Japanese Application No. 2020-538569 dated Oct. 18, 2021, 7 pages (with English translation).
3GPP TS 38.401, V1.0.0 (Dec. 2017), "3rd Generation Partnership Project; Technical Specification Group Radio Access Network; NG-RAN; Architecture description (Release 15)," Dec. 2017, 22 pages.
Office Action issued in Australian Application No. 2019207029 dated Oct. 13, 2021, 6 pages.
Samsung, "Further Considerations on the CN and RAN Paging," 3GPP TSG-RAN WG2 #100, R2-1712195, Reno, USA, Nov. 27-Dec. 1, 2017, 3 pages.
Office Action issued in Russian Application No. 2020126718/07(047001) dated Mar. 17, 2022, 16 pages (with English translation).

* cited by examiner

COMMUNICATION METHOD, COMMUNICATIONS DEVICE, AND COMMUNICATIONS SYSTEM

CROSS-REFERENCE TO RELATED APPLICATIONS

This application is a continuation of International Application No. PCT/CN2019/071162, filed on Jan. 10, 2019, which claims priority to Chinese Patent Application No. 201810030917.4, filed on Jan. 12, 2018. The disclosures of the aforementioned applications are hereby incorporated by reference in their entireties.

TECHNICAL FIELD

This application relates to the communications field, and more specifically, to a communication method, a communications device, and a communications system.

BACKGROUND

In a next-generation mobile communications system, for example, in a 5th generation mobile communications (5G) system, a base station is referred to as a gNB or an ng-eNB. The ng-eNB is a Long Term Evolution Advanced base station evolved from a Long Term Evolution (LTE) system base station (LTE eNB). For ease of description only, the gNB is used in this specification to represent a base station. A system 100 shown in FIG. 1 is a schematic block diagram of a 5G system. In a next-generation radio access network (NG-RAN), gNBs, ng-eNBs, and a gNB and an ng-eNB are connected to each other by using Xn interfaces. A gNB and a 5G core (5GC) network device are connected to each other by using an Ng interface, and an ng-eNB and a 5GC device are connected to each other by using an Ng interface. The 5GC device may be an access and mobility management function (AMF) entity or a user plane function (UPF) entity. The AMF entity is mainly responsible for access management functions, and the UPF entity is mainly responsible for session management functions. A base station usually includes logical function protocol layers such as a Radio Resource Control (RRC) layer, a Service Data Adaptation Protocol (SDAP) layer, a Packet Data Convergence Protocol (PDCP) layer, a Radio Link Control (RLC) layer, a Media Access Control (MAC) layer, and a physical layer (PHY). A next-generation base station (such as a gNB) evolves from a conventional base station architecture. FIG. 2 is a schematic block diagram of a 5G system. The system 200 includes a 5GC and an NG-RAN. In the NG-RAN, a base station gNB may include a centralized unit (CU) and distributed units (DU). A CU-DU architecture may be understood as division of functions of a base station in a conventional access network. Some of the functions of the conventional base station are deployed in the CU, and the remaining functions are deployed in the DUs. A plurality of DUs may share one CU, to reduce costs and facilitate network expansion. The CU and the DUs exchange information by using F1 interfaces. The gNB including the CU and the DUs is a base station for other external network elements.

In a schematic block diagram of a 5G system shown in FIG. 3, in a gNB, a centralized unit CU may be further divided into a CU control plane (CU-CP) and a CU user plane (CU-UP). The CU-CP is responsible for control plane functions and mainly includes RRC layer and a PDCP control plane part (PDCP-C), where the PDCP-C is mainly responsible for control plane encryption and decryption, integrity protection, data transmission, and the like. The CU-UP is responsible for user plane functions and mainly includes SDAP layer and a PDCP-U, where the SDAP layer is mainly responsible for processing data in a core network and mapping a flow onto a radio bearer, and the PDCP-U is mainly responsible for encryption and decryption, integrity protection, header compression, sequence number maintenance, data transmission, and the like on a data plane. The CU-CP and the CU-UP are connected by using an E1 interface. The CU-CP represents the gNB and is connected to the core network by using an Ng interface. The CU-CP is connected to a DU by using an F1-C (F1 control plane) interface, and the CU-UP is connected to the DU by using an F1-U (F1 user plane) interface. Another design is that both the PDCP-C and the PDCP-U are on the CU-UP, and the RRC is on the CU-CP (not shown in FIG. 3).

Based on the CU-DU architecture of the base station or a derivative architecture thereof, there is still at least one of the following problems:

A current paging procedure for UE in which exists faultiness, and may result in a failure in UE paging.

When the UE enters an inactive status, the CU instructs the DU to release a UE context of the UE. However, the mechanism still exists faultiness.

In a process in which the UE accesses a network, there may be a system error caused by a weakness of an admission control mechanism.

SUMMARY

This application provides a communication method, a communications device, a communications system, and the like, so as to resolve a problem that a paging procedure for a terminal device in a CU-DU base station architecture or a derivative architecture thereof still exists faultiness, and may result in a UE paging failure.

According to a first aspect, an embodiment of this application provides a communication method, where the communication method is executed in a communications system, the communications system includes a centralized unit and a distributed unit, and when the communications system is running, the following example operations may be performed:

sending, by the centralized unit CU, a paging message to the distributed unit DU, where the paging message carries indication information indicates that the paging is paging originated from a core network or the paging is paging originated from a radio access network; receiving, by the distributed unit, the paging message, and determining, from the indication information carried in the paging message, that the paging is paging originated from the core network or the paging is paging originated from the radio access network. According to the solution, the DU can determine whether the received paging message is originated from the core network or from the RAN side (for example, paging generated by the CU), so as to correctly broadcast the paging through an air interface.

An optional design according to the first aspect includes: If the indication information is identity information of a paged terminal device that is originated from the core network, the indication information indicates that the paging is paging originated from the core network, and is used to instruct the distributed unit to determine that the paging is paging originated from the core network; or if the indication information is identity information of a paged terminal device configured by the radio access network, the indication information indicates that the paging is paging originated from the radio access network, and is used to instruct the distributed unit to determine that the paging is paging originated from the radio access network. According to the solution, the identity information of a paged terminal device that is originated from the core network and that is carried in the paging message transmitted through an interface between the CU and the DU may be used to indicate that the paging is paging originated from the core network; or the identity information of a paged terminal device configured by the radio access network and carried in the paging message transmitted through an interface between the CU and the DU (or other information that can identify the paged terminal device) may be used to indicate that the paging is paging originated from the radio access network.

An optional design according to the first aspect includes: The paging message further includes identity information of a paged terminal device or information that can identify a paged terminal device. The indication information carried in the paging message may be used to indicate that the paging is paging originated from the core network or the paging is paging originated from the radio access network. After receiving the indication information, the distributed unit may determine that the paging is paging originated from the core network or the paging is paging originated from the radio access network. For example, if the indication information indicates that the paging is paging originated from the core network, the distributed unit may determine, based on the indication information, that the paging is paging originated from the core network; or if the indication information indicates that the paging is paging originated from the radio access network, the distributed unit may determine, after receiving the indication information, that the paging is paging originated from the radio access network.

An optional design according to the first aspect includes: The paging message includes identity information of a paged terminal device; and that the indication information indicates that the paging is paging originated from the core network or paging originated from the radio access network, and the indication information is used to instruct the distributed unit to determine that the paging is paging originated from the core network or the paging is paging originated from the radio access network includes: If the indication information indicates that the identity information of a paged terminal device is originated from the core network, the indication information indicates that the paging is paging originated from the core network, and is used to instruct the distributed unit to determine that the paging is paging originated from the core network; or if the indication information indicates that the identity information of a paged terminal device is configured by the radio access network, the indication information indicates that the paging is paging originated from the radio access network, and is used to instruct the distributed unit to determine that the paging is paging originated from the radio access network. According to the solution, the paging message transmitted between the CU and the DU carries the indication information. By using the indication information, the CU can inform the DU whether UE identity information carried in the paging message is originated from the core network or configured by the RAN, so that the DU can determine whether the paging is paging originated from the core network or paging originated from the RAN.

An optional design according to the first aspect includes: The indication information includes identity information of a paged terminal device that is originated from the core network or identity information of a paged terminal device configured by the radio access network; and when the indication information includes the identity information of a paged terminal device that is originated from the core network, the indication information indicates that the paging is paging originated from the core network, and is used to instruct the distributed unit to determine that the paging is paging originated from the core network; or when the indication information includes the identity information of a paged terminal device configured by the radio access network, the indication information indicates that the paging is paging originated from the radio access network, and is used to instruct the distributed unit to determine that the paging is paging originated from the radio access network. According to the solution, the paging message between the CU and the DU may include two information elements. One information element is used to carry the identity information of a paged terminal device that is originated from the core network, and the other information element is used to carry the identity information of a paged terminal device configured by the radio access network. When the method is performed, either of the two information elements may be selected to send content of the information element.

An optional design according to the first aspect includes: The distributed unit includes at least one of the following: a Radio Link Control layer, a Media Access Control layer, and a physical layer; the centralized unit includes at least one of the following: a Radio Resource Control layer, a Service Data Adaptation Protocol layer, and a Packet Data Convergence Protocol layer; the distributed unit and the centralized unit are included in the radio access network and are communications nodes in the radio access network; and the distributed unit and the centralized unit may constitute a logical base station.

According to a second aspect, an embodiment of this application provides a communication method, where the communication method is executed in a communications system, to help resolve a problem that in a process in which UE accesses a network, there may be a system error caused by a weakness of an admission control mechanism. The communications system includes a centralized unit and a distributed unit, and when the communications system runs, the following example operations may be performed: rejecting, by the centralized unit, an access request of a terminal device; and sending, by the centralized unit, indication information to the distributed unit, where the indication information indicates that the distributed unit needs to delete context information of the terminal device.

An optional design according to the second aspect includes: The indication information includes an indication of rejecting access of the terminal device and/or a cause of rejecting access of the terminal device.

An optional design according to the second aspect includes: receiving, by the centralized unit, a notification message sent from the distributed unit and indicates that access of the terminal device is allowed.

According to a third aspect, this application provides a communications device, where the communications device includes at least one processor and a communications interface. The communications interface is configured for information exchange between the communications device and another communications device, and when a program instruction is executed in the at least one processor, the communications device implements functions of the centralized unit or the distributed unit in any one of the first aspect, the second aspect, or the optional designs of the first aspect and the second aspect.

According to a fourth aspect, this application provides a computer program product, where the computer program product comprises a program instruction, and when the program instruction is directly or indirectly executed, functions of the centralized unit or the distributed unit in any one of the first aspect, the second aspect, or the optional designs of the first aspect and the second aspect are implemented.

According to a fifth aspect, this application provides a computer program storage medium, where the computer program storage medium stores a program instruction, and when the program instruction is directly or indirectly executed, functions of the centralized unit or the distributed unit in any one of the first aspect, the second aspect, or the optional designs of the first aspect and the second aspect are implemented.

According to a sixth aspect, this application provides a chip system, where the chip system includes at least one processor, and when a program instruction is executed in the at least one processor, functions of the centralized unit or the distributed unit in any one of the first aspect, the second aspect, or the optional designs of the first aspect and the second aspect are implemented.

According to a seventh aspect, this application provides a communications system, where the communications system includes the communications device according to the third aspect.

DESCRIPTION OF EMBODIMENTS

Figure 1:
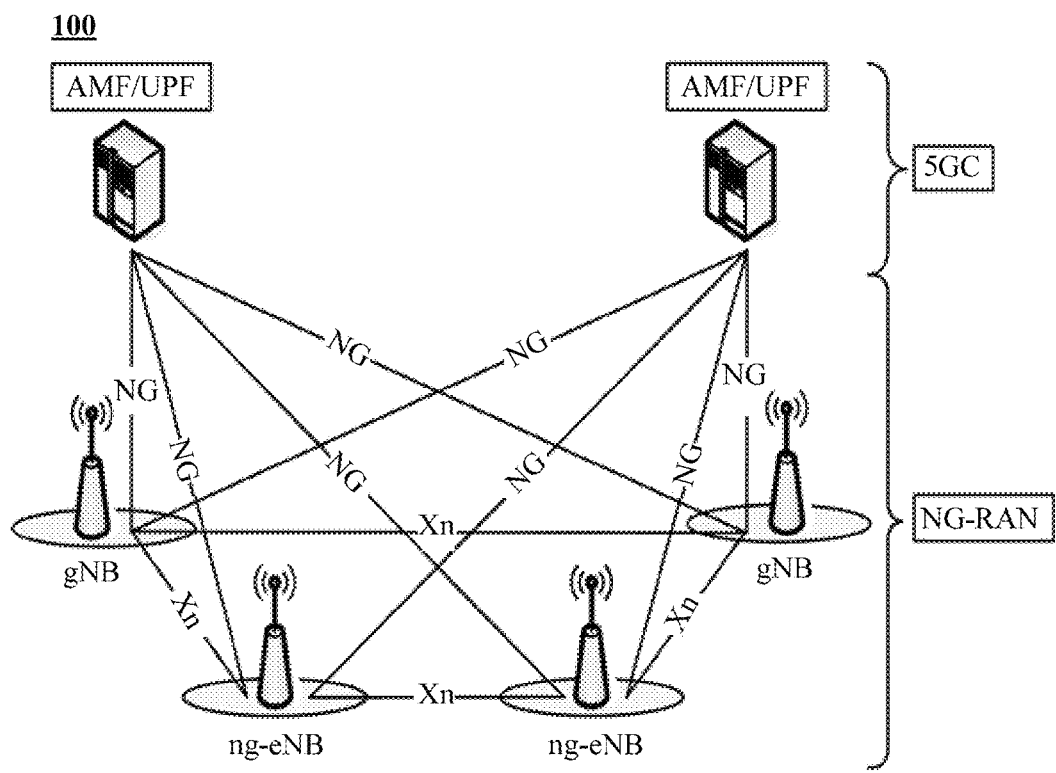
FIG. 1 is a schematic block diagram of a 5G system according to an embodiment of this application.
Figure 2:
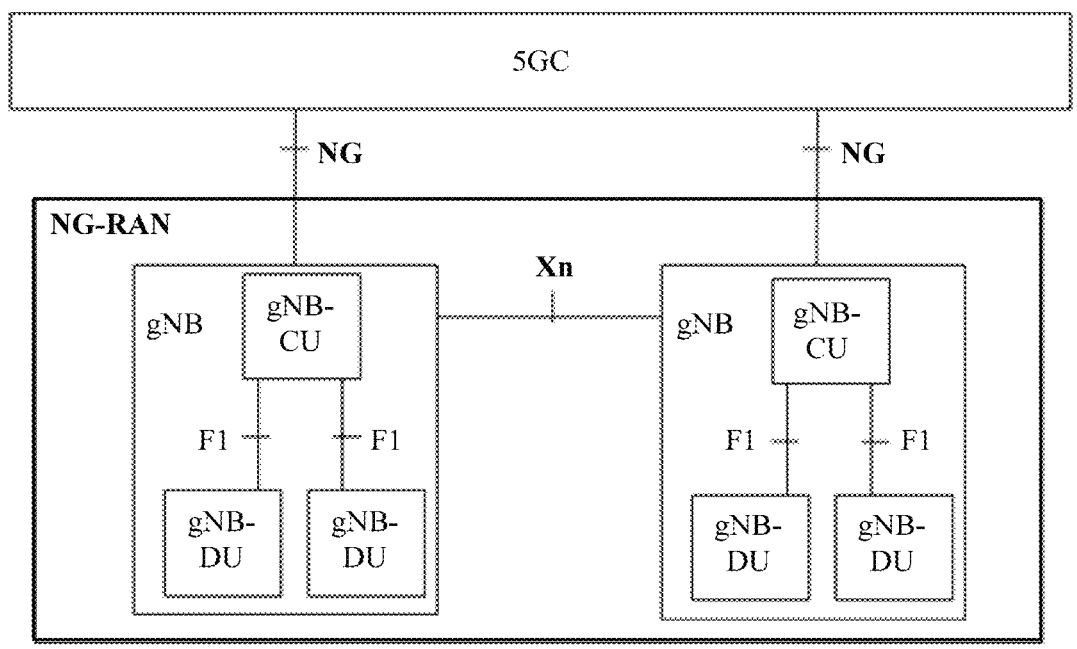
FIG. 2 is a schematic block diagram of a 5G system according to an embodiment of this application.

First, a common part of the terms in the embodiments of this application is generally described.

The terms "first", "second", and the like in this application are merely intended to distinguish between different objects, and do not limit an actual order or function of the objects modified thereby. For example, "first" and "second" in "a first indication" and "a second indication" are merely intended to identify that the two indications are different indications, and do not limit an actual sequential order or function of the two indications. Expressions such as "for example", "an example", "such as", "an optional design", and "a design" in this application are merely used to represent giving an example, an illustration, or a description. Any embodiment or design scheme described as "an example", "an optional design", or "a design" in this application should not be explained as being more preferred or having more advantages than another embodiment or design scheme. Exactly, these words are used to present related concepts in a specific manner. The terms "uplink" and "downlink" in this application are used to describe data/information transmission directions in a specific scenario. For example, an "uplink" direction is usually a direction of data/information transmission from a terminal device to a network side or a direction of data/information transmission from a distributed unit to a centralized unit; and a "downlink" direction is usually a direction of data/information transmission from a network side to a terminal device or a direction of data/information transmission from a centralized unit to a distributed unit. It can be understood that "uplink" and "downlink" are merely used to describe data/information transmission directions, and specific devices for starting and stopping the data/information transmission are not limited.

The term "and/or" in this application describes only an association relationship for describing associated objects and represents that three relationships may exist. For example, A and/or B may represent the following three cases: Only A exists, both A and B exist, and only B exists. Moreover, unless otherwise specified, the character "/" in this application usually indicates an "or" relationship between the associated objects. The character "-" in this application is usually used to indicate that there is a correspondence/association relationship/mapping relationship/collaborative relationship between two objects before and after the character. For example, "-" in the expression "user plane functions processed by using a Packet Data Convergence Protocol (PDCP-U)" may be understood as indicates a corresponding user plane function in PDCP functions.

Unless otherwise specified, a meaning of an expression similar to the expression "an item includes at least one of the following: A, B, and C" in this application usually is that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and another combination of A, B, and C. The foregoing describes options of the item by using three elements A, B, and C as an example. When the expression is "an item includes at least one of the following: A, B, . . . , and X", that is, when the expression has more elements, options that are applicable to the item may also be obtained according to the foregoing rule.

Names are assigned to various types of objects such as various messages/information/devices/network elements/systems/apparatuses/actions/operations/procedures/concepts that may appear in this application. It can be understood that these specific names do not constitute a limitation on related objects, and the assigned names may vary with factors such as scenarios, contexts, or use habits. Understandings of technical meanings of the technical terms in this application should be determined mainly according to functions and technical effects embodied/performed by the technical terms in the technical solutions.

In this application, the terminal device may include the forms as below: user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, may be a cellular phone, a cordless phone, a Session Initiation Protocol (SIP) phone, a wireless local loop (WLL) station, a personal digital assistant (PDA), a handheld device or computing device having a wireless communication function, another processing device connected to a wireless modem, an in-vehicle device, a wearable device, and a terminal device in a next-generation communications system such as a 5G network or a future evolved public land mobile network (PLMN). The terminal device may alternatively be a wearable device. The wearable device may also be referred to as a wearable intelligent device, and is a general name of wearable devices that are obtained through intelligent design and development on daily wears by using a wearable technology, such as glasses, gloves, a wristwatch, clothing, and shoes. The wearable device is a portable device that is directly worn on a body or integrated into a piece of clothing or an accessory of a user. The terminal device may alternatively be a terminal device in an Internet of Things (IoT) system. The IoT is an important part of the development of future information technologies, and a main technical characteristic of the IoT is to connect products to networks by using communications technologies, thereby implementing an intelligent network with man-machine interconnections and thing-thing interconnections. In the embodiments of this application, the solutions of the embodiments are described by using an example in which the terminal device is UE. However, it can be understood that the terminal device in the embodiments of this application is not limited to the UE.

In the embodiments of this application, a base station including the CU and the DU is not limited to an NR gNB, and may be an LTE base station. Alternatively, the CU is further divided into two parts: a CP and an UP. When a base station including the CU and the DU is an LTE base station, protocol layers do not include an SDAP layer.

A network architecture and a service scenario that are described in the embodiments of this application are used to help a reader clearly understand the technical solutions in the embodiments of this application, and do not constitute any limitation on the technical solutions provided in the embodiments of this application. A person of ordinary skill in the art may understand that with the evolution of network architectures and the emergence of new service scenarios, the technical solutions provided in the embodiments of this application are also applicable to similar technical problems.

On a RAN, UE usually has an RRC connected status and an RRC idle status, and may further have an RRC inactive status, which may also be referred to as a third status. When the UE is in the inactive status (for example, a time in which a terminal has no uplink and/or downlink data to be sent exceeds a specified time), a base station may instruct, by using an RRC message, the UE to enter the RRC inactive status. After the UE accesses a cell, the base station establishes a corresponding UE context for the UE. When an RRC status of the UE changes, the base station correspondingly processes the UE context of the UE. For example, the UE changes from the RRC connected status to the RRC idle status; and correspondingly, the base station may release the UE context of the UE; or when the UE changes from the RRC connected status to the RRC inactive status, possible processing is to maintain or suspend the UE context of the UE, for example, to retain, on the base station and/or the UE, the UE context of the UE on the RAN.

For a base station having a CU-DU architecture and/or having an advanced CU-DU derivative architecture, a CU in the base station usually has an RRC layer, and the RRC layer has a function of managing RRC status of UE. The UE in an RRC idle status and the UE in an RRC inactive status have two paging types: core network-based paging (CN-based paging) and radio access network-based paging (RAN-based paging). Particularly, there is another possible case: The UE considers that the UE is in the RRC inactive status, but actually a network side determines at that time that the UE is in the RRC idle status. In this case, the network side still pages the UE through core network-based paging. Core network-based paging mentioned herein may be considered as paging initiated by a core network, and radio access network-based paging mentioned herein may be considered as paging initiated by a radio access network, such paging initiated by a network node in the radio access network, such as a base station, a CU, or a CP. Core network-based paging usually needs to be forwarded by a base station. A difference between paging initiated by the core network and paging initiated by the base station herein lies in that paging initiators are different. The UE needs to identify whether received paging is core network-based paging or RAN-based paging. For paging initiated by the core network, a final discontinuous reception cycle (DRX cycle) of the UE may be a smaller value selected from a UE specific DRX cycle sent by the core network and a default DRX cycle broadcast by a cell (which may alternatively be a value corresponding to the selected smaller value). For paging initiated by the base station, a final DRX cycle of the UE may be a smallest value selected from a UE specific DRX cycle sent by the core network, a RAN UE DRX cycle carried in an RRC message received by the UE, and a default DRX cycle broadcast by a cell (which may be a value corresponding to the selected smallest value). A special case is that if one or more of the foregoing DRX cycles do not exist, a smaller value is selected from other one or more DRX cycles.

A paging message sent by a CU to a DU may carry a paging DRX information element. The information element may be a smaller one selected from the following two: a UE specific CN DRX cycle and a UE specific RAN DRX cycle. However, the paging message sent by the CU to the DU neither identify whether the paging is paging originated from the CN or paging from the RAN, nor indicate how to deal with the paging when the UE enters the RRC inactive status.

In addition, when the UE enters the inactive status, the CU usually instructs the DU to release the UE context of the UE. However, the mechanism still exists faultiness. For example, the DU cannot intervene in decision making of the CU on whether to release the UE context. For another example, after the DU receives a notification of releasing the UE context and before the DU forwards, to the UE, an RRC connection release message sent by the CU to the UE, if UE uplink data arrival (UL data arrival) occurs, for example, a scheduling request (SR) or a buffer status report (BSR) sent by the UE to the base station (the DU and/or the CU) arrives, a system error may occur.

For another example, in a CU-DU RAN architecture, the UE requests to establish an RRC connection to a RAN. Generally, a DU or a CU in a base station may reject the RRC connection establishment request of the UE. For example, the UE sends a message 3 (MSG3) to request to establish the RRC connection (for example, to newly establish, resume, or reestablish the RRC connection), and the DU sends an RRC message in the MSG3 to the CU, where the MSG3 carries a cell radio network temporary identifier (cell radio network temporary identifier, C-RNTI) or temporary cell radio network temporary identifier (Temp CRNTI) allocated to the UE and DU to CU RRC information (DU to CU RRC information), and the DU to CU RRC information includes a layer 1 (L1) and/or layer 2 (L2)

parameter of a signaling radio bearer 1 (signaling radio bearer, SRB1) configured by the DU for the UE. For example, in the NR, the RRC information includes a cell group configuration CellGroupConfig. If receiving the DU to CU RRC information sent by the DU, the CU determines that the DU allows UE access; otherwise, it considers that the CU does not allow UE access. In the foregoing process in which the UE requests to establish the RRC connection, the CU may perform admission control on UE access. For example, when the CU rejects UE access to the RAN, the CU may send a response to the UE. The response is specific to the RRC message carried in the MSG3 sent by the UE to the base station, and the response indicates that a request that the UE expects to establish the RRC connection is rejected. Usually, the RRC message is carried in an RRC container in the MSG3 to be sent to the DU. However, the DU does not parse content in the RRC container about whether the CU accepts or rejects the RRC connection establishment request. In this case, if the DU allows UE access, and the CU also allows access in default system settings, the DU establishes a protocol stack entity (such as an RLC entity and a MAC logical channel) for SRB1 transmission for the UE, and establishes a context for the UE. The context of the UE includes a C-RNTI and an F1 interface ID (such as DU UE F1AP ID and/or CU UE F1SP ID) that are of the UE. In addition, the DU or the CU may alternatively perform scheduling for a subsequent RRC message (for example, a MSG5) of the UE. Optionally, there is a first case: The DU starts a timer after sending the message 3; and after the timer expires, the DU still receives no UE context setup request message (UE context setup request) sent by the CU, and the DU may delete a related configuration and the UE context. Alternatively, there is a second case: The DU reads an RRC message type included in the MSG3, and determines, based on the RRC message type, whether the CU rejects the RRC connection establishment/reestablishment/resumption request initiated by the UE, so as to determine whether the DU deletes the configuration and/or the UE context. In the first case, if the timer is set inappropriately, a system error occurs. For example, if duration of the timer is set to be relatively small, after the DU deletes the configuration and/or the UE context, the DU receives a UE context setup request message sent by the CU. In this case, UE context setup fails because the DU has deleted the configuration and/or the UE context. The second case does not meet a premise that an RRC layer is on the CU in a 5G RAN system. According to an embodiment of the present invention, if the CU rejects UE access, the CU explicitly instruct the DU to delete the foregoing configuration and the UE context.

The following describes the technical solutions in this application with reference to the accompanying drawings and the embodiments.

Figure 4:
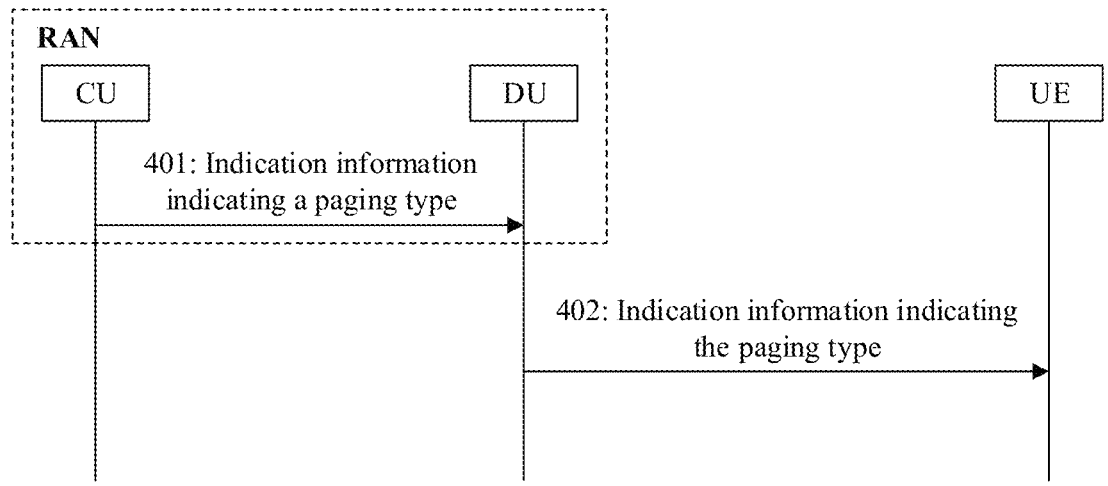
FIG. 4 is a schematic diagram of a communications system and method according to an embodiment of this application.

As shown in FIG. 4, an embodiment of this application provides a communications system and a method thereof 400, so as to resolve a problem that a paging mechanism in a CU-DU architecture exists faultiness, for example, a current paging mechanism may cause a system error when UE in an RRC inactive status is paged.

In view of this, one of main ideas of this embodiment may be expressed as: A CU provides indication information to a DU, and the indication information indicates that paging is core network-based paging and/or RAN-based paging, so that the DU can determine and notify UE that the paging is core network-based paging and/or RAN-based paging. As shown in FIG. 4, the system 400 includes a CU, a DU, and UE; and the CU and the DU serve as function nodes in a RAN architecture. The system 400 may run in the following example manners.

Operation 401: The CU sends, to the DU, indication information used to indicate a paging type.

The indication information used to indicate the paging type may be generated by the CU. The indication information used to indicate a paging type may be carried in an F1 application layer protocol (F1 AP) paging message sent by the CU to the DU.

An optional design 1 according to step 401 includes: If the indication information used to indicate the paging type is identity information of paged UE that is originated from a core network, the indication information indicates that the paging is paging originated from the core network, and is used to instruct the distributed unit to determine that the paging is paging originated from the core network; or if the indication information is identity information of paged UE configured by a radio access network, the indication information indicates that the paging is paging originated from the radio access network, and is used to instruct the distributed unit to determine that the paging is paging originated from the radio access network. Optionally, the indication information may be functionally referred to as a resume identity (resume ID), or is other identity information derived from the resume identity. The resume identity may be used by the UE in an RRC inactive status. The resume identity may be further used to indicate that the paging is paging originated from the RAN (RAN-based paging). The resume identity may be further used to obtain a context of the UE.

According to the optional design 1, an example implementation includes: The F1 AP paging message sent by the CU to the DU may carry two information elements (IE): a UE identity index value and a UE paging identity. The UE identity index value may be UE_ID. The UE_ID may be obtained according to a formula: UE_ID=IMSI mod 1024. The UE paging identity may be an S-TMSI originated from the core network or an IMSI, where the S-TMSI is an SAE temporary mobile subscriber identity originated from the core network, and the IMSI is an international mobile subscriber identity of the UE. It can be understood that the UE paging identity of the core network in an NR system may have another name. This is not limited in this specification. The foregoing two values may be used to calculate a paging frame (PF) and a paging occasion (PO). When the paging is paging originated from the core network (CN based paging), UE identity information (such as the UE paging identity) provided by the CU to the DU is originated from the core network, and the UE paging identity information may be the S-TMSI originated from the core network and/or the IMSI. When the paging is paging originated from the RAN (RAN-based paging), the UE paging identity information provided by the CU is the resume ID or UE identity information generated by the RAN for a paging process. Optionally, the UE paging identity may be proactively provided by the DU to the CU, or is sent to the CU according to a request of the CU. Based on a preset configuration, the DU identifies whether the UE paging identity information generated by the core network (for example, the paging identity may be the TMSI originated from the core network or the IMSI) or the UE paging identity information generated by the RAN (for example, the paging identity may be the resume ID or the UE identity information generated by the RAN for the paging process) is received. Optionally, the DU may determine a discontinuous reception cycle of the UE based on the paging type. Optionally, when the DU identifies that the paging is core network-based paging, the DU determines that a final discontinuous reception cycle of the UE may include a smaller value selected from a UE specific DRX cycle sent by the core network and a default DRX cycle broadcast by a cell (which may alternatively be a value corresponding to the selected smaller value). Optionally, when the DU identifies that the paging is radio access network-based paging, the DU determines that a final DRX cycle of the UE may include a smallest value selected from a UE specific DRX cycle sent by the core network, a RAN UE DRX cycle carried in an RRC message received by the UE, and a default DRX cycle broadcast by a cell (which may be a value corresponding to the selected smallest value). A possible case is that if one or more of the foregoing DRX cycles do not exist, a smaller value is selected from other one or more DRX cycles.

After the DU receives the F1 AP paging message, optionally, in operation 402, the DU sends, to the UE, the indication information used to indicate the paging type. For example, the UE paging identity information may be added to a broadcast paging message (for example, added to an information element PagingRecord) and is broadcast through an air interface, and/or an indication is added to a broadcast paging message sent the UE, so that the UE can determine whether the paging is paging originated from the RAN or paging originated from the CN. For example, an indication of whether the paging is RAN based paging may be given in PagingRecord. For example, 0 indicates CN based paging, while 1 indicates RAN based paging. Optionally, the UE may determine, according to the indication, whether the paging is core network-based paging or radio access network-based paging. Similar to the manner of determining the final discontinuous reception cycle by the DU, the UE may determine the final discontinuous reception cycle based on the paging type. An optional design 2 according to operation 401 includes: The paging message sent by the CU to the DU includes identity information of paged UE. In this case, when the indication information used to indicate the paging type indicates that the paging is paging originated from the core network or paging originated from the radio access network, the indication information is used to instruct the DU to determine that the paging is paging originated from the core network or the paging is paging originated from the radio access network. A specific process includes the following.

When the indication information indicates that the identity information of the paged UE is originated from the core network, it indicates that the paging is paging originated from the core network, and the indication information is used to instruct the DU to determine that the paging is paging originated from the core network; or when the indication information indicates that the identity information of the paged UE is configured by the radio access network, it indicates that the paging is paging originated from the radio access network, and the indication information is used to instruct the DU to determine that the paging is paging originated from the radio access network.

Optionally, in addition to the information element: UE paging identity, an explicit information element may be set in the F1 AP paging message sent by the CU to the DU as an indication. For example, the indication may be a RAN based paging indication. When a value of the indication is 0, it indicates that the paging is paging originated from the core network. On the contrary, when a value of the indication is 1, it indicates that the paging is paging originated from the radio access network. Alternatively, the indication may be a CN based paging indication. When a value of the indication is 0, it indicates that the paging is paging originated from the radio access network. On the contrary, when a value of the indication is 1, it indicates that the paging is paging originated from the core network.

An optional design 3 according to operation 401 includes: The indication information used to indicate the paging type includes identity information of a paged terminal device that is originated from the core network or identity information of a paged terminal device configured by the radio access network. Optionally, two information elements may be set in the indication information. One information element is used to carry the identity information of a paged terminal device that is originated from the core network, and the other information element is used to carry the identity information of a paged terminal device configured by the radio access network. However, when the indication information is sent, either of the two information elements may be selected to send information carried in the two information elements. For example, when the indication information includes the identity information of a paged terminal device that is originated from the core network, the indication information indicates that the paging is paging originated from the core network, and is used to instruct the distributed unit to determine that the paging is paging originated from the core network; or when the indication information includes the identity information of a paged terminal device configured by the radio access network, the indication information indicates that the paging is paging originated from the radio access network, and is used to instruct the distributed unit to determine that the paging is paging originated from the radio access network.

For example, when one information element in the F1 AP paging message sent by the CU to the DU carries UE identity information configured by the CN, it indicates that the paging is paging originated from the CN; or when another information element in the F1 AP paging message sent by the CU to the DU carries UE ID information configured by the RAN, it indicates that the paging is paging originated from the RAN. In an optional design, if the paging is paging originated from the CN (CN based paging), the F1 AP paging message sent by the CU to the DU includes the UE paging identity, and the UE paging identity may carry UE identity information allocated by the CN; or if the paging is paging originated from the RAN (RAN-based paging), the F1 AP paging message sent by the CU to the DU includes a newly specified information element. For example, the information element is a UE paging identity originated from the radio access network (UE Paging identity for RAN based Paging), and the information element may carry UE identity information allocated by the RAN.

For another example, a new IE may additionally set in the F1 AP paging message sent by the CU to the DU, so that the CU provides, to the DU by using the new IE, a resume ID or UE identity information generated by the RAN for a paging process, to indicate that the paging type is RAN based paging. For example, the new IE may be the UE paging identity for RAN based paging.

After the DU receives the F1 AP paging message including the new IE, optionally, in operation 402, the DU may add, to a paging message (for example, to the information element PagingRecord) broadcast through an air interface, the received resume ID or the UE identity information (such as UE Paging Identity for RAN based paging) generated by the RAN for the paging process, and send the paging message to the UE, or add an indication to a broadcast paging message sent to the UE, so that the UE can determine whether the paging is paging originated from the RAN or paging originated from the CN. For example, an indication of whether the paging is RAN based paging may be given in PagingRecord. For example, 0 indicates CN based paging, while 1 indicates RAN based paging. In this way, operation 402 is performed, that is, the DU sends, to the UE, the indication information used to indicate the paging type.

It should be noted that operation 401 is an optional operation. To be specific, the CU may alternatively not send the indication information used to indicate a paging type to the DU, and a specific paging type is determined by the DU. For example, for RAN-based paging and CN based paging, the UE identity information originated from the core network may be used by both the CU and the DU, and the DU identifies RAN-based paging or CN based paging at an air interface. Optionally, in operation 402, an indication of whether the paging is RAN based paging is added to a broadcast paging message sent by the DU. For example, an indicator bit indicates whether the paging is RAN based paging may be given in the information element PagingRecord. When a value of the bit is 0, it indicates that the paging is CN based paging; or when a value of the bit is 1, it indicates that the paging is RAN based paging. It can be understood that a specific value may have different meanings. For example, when the value of the bit is 1, it indicates that the paging is CN based paging; or when the value of the bit is 0, it indicates that the paging is RAN based paging.

Figure 3:
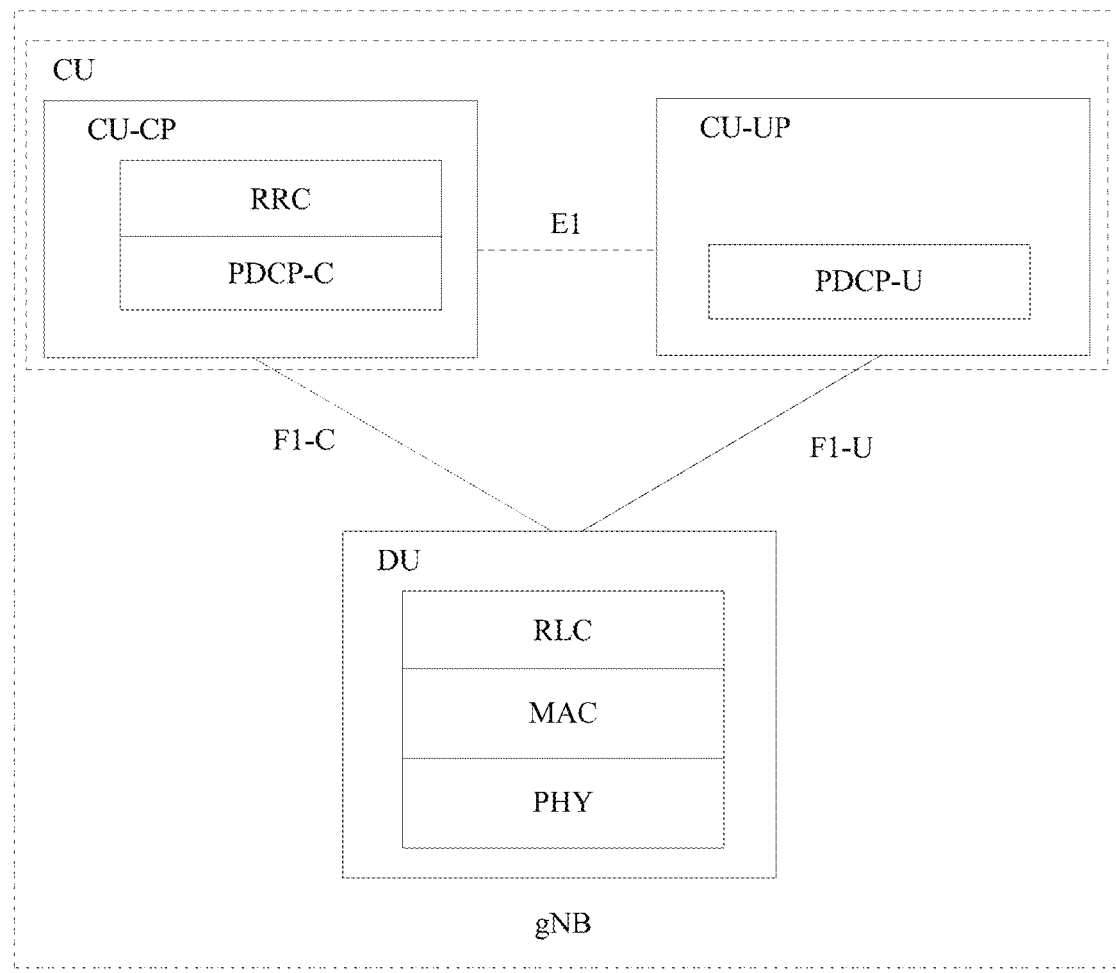
FIG. 3 is a schematic block diagram of a 5G system according to an embodiment of this application.

It can be understood that the CU in the system 400 may be further divided into a CP and an UP in the manner of FIG. 3. In an architecture in which the CP and the UP are further separated, the foregoing functions of the CU in the system 400 may be implemented by the CP. Certainly, the foregoing functions of the CU in the system 400 may alternatively be implemented in the UP.

It can be understood that the UE identity information configured by the RAN that is mentioned in any one of the foregoing designs may be other information that may be used to identify the UE and that is configured by the RAN, provided that configured related information of the UE can identify the UE, or facilitate finding of a context of the UE, or facilitate identification of a paging type for the UE. It can be understood that "configured by the RAN" mentioned in this specification means: The CU in the RAN may perform the configuration, the DU may perform the configuration, or the CU and the DU complete the configuration through negotiation. For example, for paging initiated by the RAN, the CU, the DU, or the CU and the DU together configure, for the paging, a piece of information that can identify the UE, to help the DU identify whether a type of the paging is paging initiated by the core network or paging initiated by the radio access network.

Figure 5:
FIG. 5 is a schematic diagram of a communications system and method according to an embodiment of this application.

As shown in FIG. 5, an embodiment of this application further provides a communications system and a method thereof 500, so as to help overcome a weakness that still exists in a mechanism in which when UE enters an inactive status, a CU instructs a DU to release a UE context of the UE. The system 500 includes a CU and a DU. When the system 500 runs, the CU and the DU exchange messages, to perform the following example method 500.

The CU sends, to the DU, a message used to release a UE context. For example, the message may be a UE context release message, and the message includes cause value information used to indicate that the UE enters an RRC inactive status. Alternatively, the CU sends, to the DU, a message used to release a UE context. For example, the message may be a UE context release message, and the message may carry a message that is used to release an RRC connection and that is sent to UE, such as an RRC connection release message. Alternatively, the CU may add an RRC connection release message to another F1 AP message such as a DL RRC message transfer message, and the message may also include a cause value (such as UE enter into inactive) and/or an RRC message type. In this case, when subsequently receiving the UE context release message sent by the CU, the DU may determine that the UE enters the RRC inactive status, and therefore needs to release the UE context. In another possible case, the DU determines that the UE enters the RRC inactive status, retains the UE context, and suspends radio signaling and/or a radio data bearer.

An optional design includes a scenario of uplink data arrival (UL data arrival): Before the DU forwards, to the UE, the RRC connection release message sent by the CU, the DU receives an SR/BSR sent by the UE, and the DU determines of UL data arrival. The DU notifies the CU that the DU rejects to release the UE context. Optionally, a notification message includes a cause value of uplink data arrival (UL data arrival). Optionally, before this, a notification message sent by the DU may carry information that the DU determines that the UE enters the inactive status. An implementation of the notification message may be an active/inactive indication or an indication of inactive timer expiration. After the DU sends a notification message to notify the CU that the UE enters the inactive status, if the DU detects uplink data arrival (UL data arrival) before receiving a reply from the CU, the DU notifies the CU of the case (namely, UL data arrival), so that the CU makes a correct decision in a timely manner. For example, the CU may determine not to allow UE to enter the RRC inactive status.

An optional design includes a scenario of downlink data arrival (DL data arrival): After the CU sends the UE context release message and/or the RRC connection release message to the DU, downlink data arrival (DL data arrival) occurs. Optionally, the CU determines that the DU has not released the UE context and/or forwarded the RRC connection release message, and optionally, the CU sends a UE context release cancel message and/or a DL RRC message transfer cancel message to the DU. The message includes a cause value (for example, DL data arrival). Optionally, the message may include paging information (for example, the information element included in any one of the three optional designs in operation 401 or at least one of a resume ID, a paging DRX, a UE Identity Index value, a Paging priority, and a UE paging identity). If the DU cancels sending the RRC connection release message and/or does not release the UE context, the DU notifies the CU that the UE context is not released or the UE does not enter the RRC inactive status. If the DU has forwarded the RRC connection release message and released the UE context, RAN-based paging may be directly initiated based the paging information.

When the CU has a CP-UP architecture, an optional design includes: A CP in the CU (CU-CP) sends the UE context release message to the DU and/or an UP in the CU (CU-UP), where the message includes the cause value UE enter into inactive. Alternatively, the CU-CP may add the RRC connection release message to another F1 AP message such as the DL RRC message transfer message. The message may also include the cause value UE enter into inactive or the RRC message type. In this way, after subsequently receiving the UE context release message sent by the CU, the DU can speculate that the UE context needs to be released due to UE enter into inactive. In another possible case, the DU determines that the UE enters the RRC inactive status, retains the UE context, and suspends radio signaling and/or a radio data bearer.

An optional design includes a case of uplink data arrival (UL data arrival). For details, refer to the descriptions of the foregoing CU-DU architecture. Functions of the CU can be implemented by the CP.

An optional design includes a case of downlink data arrival (DL data arrival). Assuming that a CU-UP notifies a CU-CP of information that the UE is in the inactive status, the CU-UP may determine, based on a timer provided by the CU-CP, whether the UE enters the inactive status. If the CU-UP has not yet received an indication of UE enter into inactive or UE context release sent by the CU-CP, the following optional operations are performed.

Optional operation 1: The CU-UP sends a DL data arrival indication to the CU-CP. For example, an E1 interface message includes an E1 interface UE identity such as a gNB-CU-UP UE E1APID, the DL data arrival indication, or the like. For subsequent operations after the CU-CP receives the DL data arrival indication information from the CU-UP, refer to the descriptions of the foregoing CU-DU architecture. Functions of the CU are implemented by the CU-CP. When the CU-CP sends a notification to the DU and determines that the UE does not enter the inactive status, the CU-CP notifies the CU-UP that downlink data DL data may be sent to the DU.

Optional operation 2: The CU-UP directly sends a DL data arrival indication or downlink data DL data to the DU, and the DU cancels sending the RRC connection release message to the UE after receiving the DL data arrival indication or the DL data. Optionally, the DU notifies the CU-CP that the UE context is not released or the UE does not enter the inactive status, where the notification message may further include the DL data arrival indication.

An optional design includes: The CU monitors a downlink transmission state, and the DU monitors an uplink transmission state and reports the uplink transmission state active/inactive to the CU. A timer may be used when the DU determines the uplink transmission state. The timer may be set by the DU or may be provided to the DU by the CU. The DU may report the uplink transmission state based on a UE granularity, a PDU session granularity, a slice granularity, or a DRB granularity. For the UE granularity, the DU may report a UE identity, an active/inactive indication, and the like. For the PDU session granularity, the slice granularity, or the DRB granularity, the DU may report a UE identity, a PDU session identity/slice identity/DRB identity, and an active/inactive status of a corresponding PDU session/slice/DRB. Optionally, a timer may alternatively be of the PDU session/slice/DRB granularity. To be specific, each PDU session identity/slice identity/DRB identity is corresponding to one timer.

An optional design includes: The DU monitors an uplink transmission state and a downlink transmission state, and reports the uplink transmission state and the downlink transmission state to the CU. A timer may be specific to both an uplink and a downlink. Alternatively, an uplink timer is specific to uplink transmission, and a downlink timer is specific to downlink transmission. The timer may be set by the DU or may be provided to the DU by the CU. Particularly, the DU may report the uplink transmission state based on a UE granularity, a PDU session granularity, a slice granularity, or a DRB granularity. The DU may report the downlink transmission state also based on the UE granularity, the PDU session granularity, the slice granularity, or the DRB granularity.

An embodiment of this application further provides a communication method. The communication method is executed in a communications system, and the communications system includes a centralized unit and a distributed unit. When the communications system runs, the following example operations may be performed: rejecting, by the centralized unit, an access request of a terminal device; and sending, by the centralized unit, indication information to the distributed unit, where the indication information indicates that the distributed unit needs to delete context information of the terminal device. In an optional design, the indication information includes an indication of rejecting access of the terminal device and/or a cause of rejecting access of the terminal device. In an optional design, the centralized unit receives a notification message sent from the distributed unit and indicates that access of the terminal device is allowed. The system and method helps resolve a prior-art problem that there is a system error caused by a weakness of an admission control mechanism when UE accesses a network. For example, the following further describes this embodiment with reference to FIG. 6 and FIG. 7.

Figure 6:
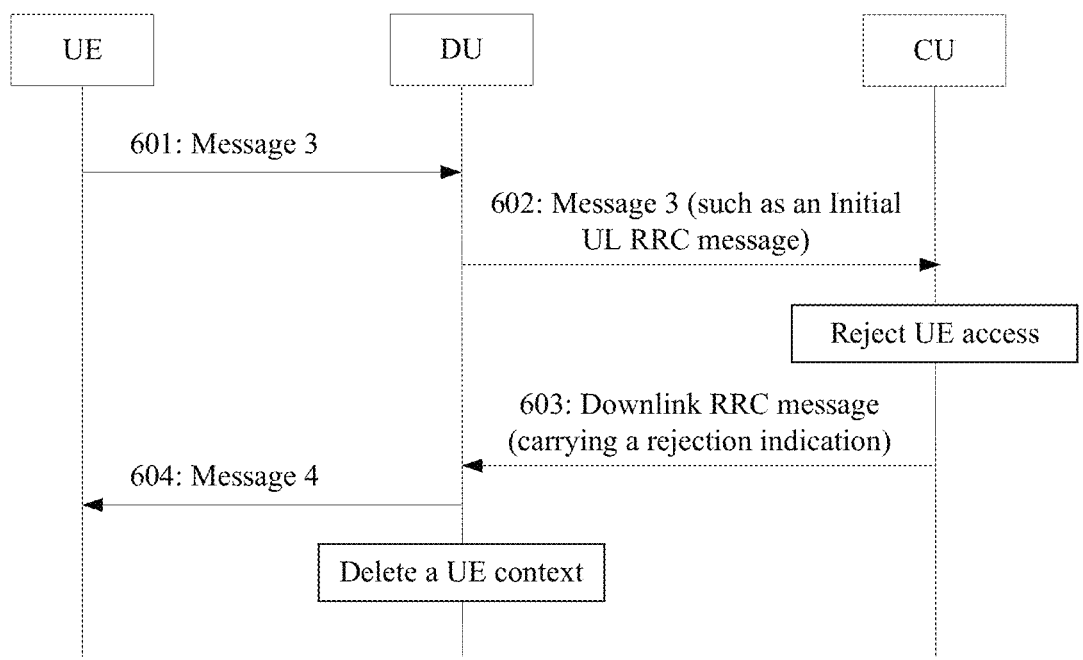
FIG. 6 is a schematic diagram of a communications system and method according to an embodiment of this application.

As shown in FIG. 6, an embodiment of this application provides a communications system and method 600. The system includes three network nodes: a CU, a DU, and UE; and the CU and the DU constitute a base station system. As shown in FIG. 6, an example of the system and method 600 includes the following operations:

Optional operation 601: The UE sends a message 3 to the base station system. The message 3 may include an RRC-ConnectionRequest message, an RRCConnectionResumeRequest message (or another similar message with a different message name), or an RRCConnectionRestablishmentRequest message.

Optional operation 602: The DU sends the message 3 to the CU. Optionally, after receiving the message 3 sent by the UE, the DU sends a CU-DU interface message such as an F1 AP message to the CU. The F1 AP message may include the message 3 from the UE. Optionally, the F1 AP message may further include a container sent by the DU to the CU, and the container carries an L1/L2 configuration of an SRB1 of the UE, such as CellGroupConfig. For example, the F1 AP message may be an initial UL RRC message. A possible case is: The DU determines whether to allow UE access, and if the DU allows UE access, the F1 AP message includes the container sent by the DU to the CU, such as DU to CU RRC information, including cell group configuration; on the contrary, if the DU does not allow UE access, the F1 AP message does not include the container sent by the DU to the CU. In this way, the CU may determine whether the DU allows UE access.

After receiving the message 3 sent by the UE, the CU may reply with a message 4 (a procedure is shown in FIG. 6, including optional operations 603 and 604). For example, the CU determines whether to allow UE access; and if the CU rejects UE access, the message 4 includes an RRC message that indicates rejection of UE access and that is corresponding to content in the message 3, such as an RRCConnectionReject message or an RRCConnectionReestablishmentReject message. Optionally, the CU sends the F1 AP message to the DU, where the F1 AP message carries a rejection indication and/or a rejection cause value, to inform the DU that the CU rejects UE access, thereby triggering the DU to delete a context of the UE (optional operation 603 shown in FIG. 6). For example, the action of deleting the context of the UE by the DU includes at least one of the following: releasing, by the DU, C-RNTI/temp CRNTI allocated to the UE; releasing, by the DU, a resource reserved for the UE; deleting the L1/L2 configuration of the UE by the DU; and releasing, by the DU, DU UE F1AP ID allocated to the UE. Optionally, the F1 AP message is a DL RRC message transfer message. Optionally, a reason why the CU determines to reject UE access may be that the DU rejects UE access or the CU rejects UE access. A possible case is: If the CU determines that the DU rejects UE access, the CU does not need to send the rejection indication to the DU; or if the CU determines that the DU allows UE access while the CU does not allow UE access, the CU needs to send the rejection indication to the DU, so as to instruct the DU to delete the context of the UE.

Figure 7:
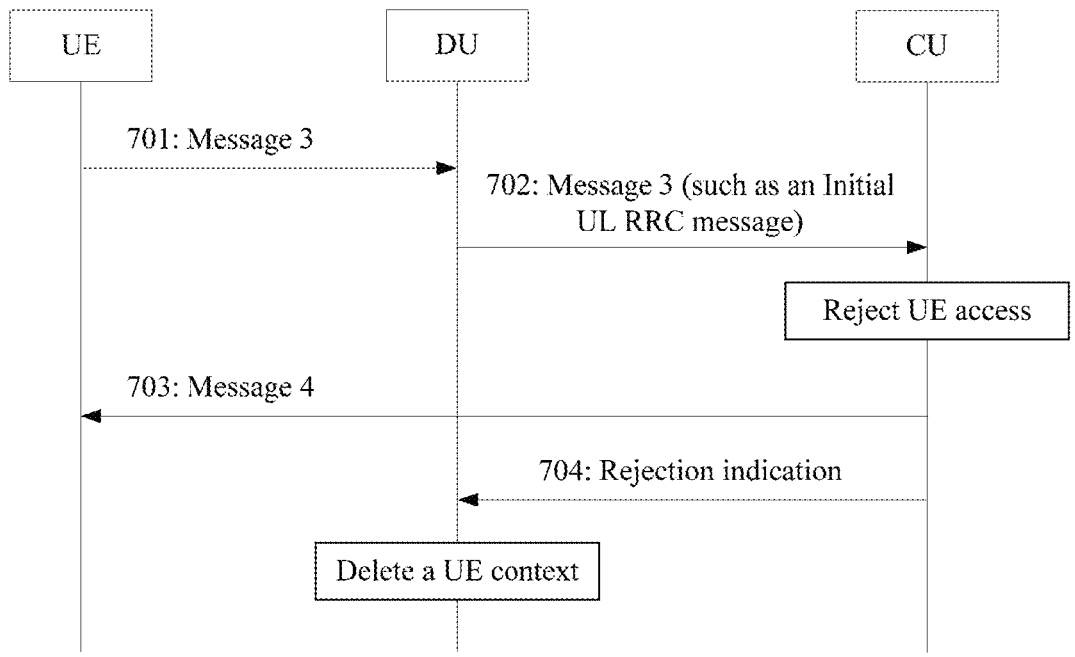
FIG. 7 is a schematic diagram of a communications system and method according to an embodiment of this application.

As shown in FIG. 7, an embodiment of this application provides a communications system and method 700. The system includes three network nodes: a CU, a DU, and UE; and the CU and the DU constitute a base station system. The system and method 700 helps resolve a prior-art problem that there is a system error caused by a weakness of an admission control mechanism when UE accesses a network. As shown in FIG. 7, an example of the system and method 700 includes the following operations:

Optional operation 701: The UE sends a message 3 to the base station system. The message 3 may include an RRC-ConnectionRequest message, an RRCConnectionResumeRequest message (or another similar message with a different name), or an RRCConnectionRestablishmentRequest message.

Optional operation 702: The DU sends the message 3 to the CU. After receiving the message 3 sent by the UE, the DU sends the message 3 to the CU. Optionally, the DU sends an F1 AP message to the CU, where the F1 AP message includes the message 3 from the UE. Optionally, the F1 AP message further includes a container sent by the DU to the CU, and the container carries an L1/L2 configuration of an SRB1 of the UE. For example, the F1 AP message may be an initial UL RRC message. Optionally, the DU informs the CU about whether the DU allows UE access. A possible case is: The DU determines whether to allow UE access, and if the DU allows UE access, the F1 AP message includes the container sent by the DU to the CU; on the contrary, if the DU does not allow UE access, the F1 AP message does not include the container sent by the DU to the CU. In this way, the CU may determine whether the DU allows UE access.

Optional operation 703: The CU replies a message 4 to the UE after receiving the message 3 sent by the UE. Optionally, the CU determines whether to allow UE access; and if the CU rejects UE access, the message 4 may include an RRC message that indicates rejection of UE access and that is corresponding to content in the message 3, such as an RRCConnectionReject message or an RRCConnection-ReestablishmentReject message. Optionally, the CU sends the F1 AP message to the DU, where the F1 AP message carries the message 4. For example, the F1 AP message may be a DL RRC message transfer message. Optionally, the CU sends a rejection indication and/or a rejection cause value to the DU, to instruct the DU to delete a context of the UE. Specifically, the CU sends the F1 AP message to the DU, where the F1 AP message includes the rejection indication and/or the rejection cause value. For example, the F1 AP message is a UE context release message. Specifically, the action of deleting the context of the UE by the DU includes at least one of the following: releasing, by the DU, C-RNTI/temp CRNTI allocated to the UE; releasing, by the DU, a resource reserved for the UE; deleting the L1/L2 configuration of the UE by the DU; and releasing, by the DU, DU UE F1AP ID allocated to the UE. Optionally, a reason why the CU determines to reject UE access may be at least one of the following: The DU rejects UE access, and the CU rejects UE access. A possible case is: If the CU determines that the DU rejects UE access, the CU does not need to send the rejection indication to the DU; or if the CU determines that the DU allows UE access while the CU does not allow UE access, the CU needs to send the rejection indication to the DU, so as to instruct the DU to delete the context of the UE.

It can be understood that operations/various optional designs are sequentially numbered in the foregoing embodiments. However, it can be understood that the sequential numbers are merely for ease of writing, and do not mean that the operations have to be performed sequentially according to the sequence numbers.

In an optional design, in the foregoing embodiments, physically, the CU-UP may be deployed separately with the CU-CP and the DU, or may be deployed together with the CU-CP and the DU. For example, there are the following possible cases: The CU-CP, the CU-UP, and the DU are all physically deployed separately; the CU-CP and the DU are physically deployed together, while the CU-UP is deployed separately; the CU-CP and the CU-CP are physically deployed together, while the DU is deployed separately; or the CU-CP is deployed separately, while the CU-UP and the DU are deployed together.

Any one of the designs shown above may be understood as a technical solution designed for a specific scenario or a specific technical problem, but should not be deemed necessary to implement the technical content disclosed in this application. Any one of the designs may be implemented in combination with another design according to requirements, to resolve a specific objective technical problem in a more targeted manner.

In an optional design, in this embodiment of this application, the distributed unit DU includes functions of RLC, MAC, and PHY protocol layers, and the centralized unit CU includes functions of RRC, an SDAP, and/or PDCP protocol layers; and the protocol layers of the DU and the CU together constitute an architecture setup including RRC, SDAP, PDCP, RLC, MAC, and PHY protocol layers of a base station or including RRC, PDCP, RLC, MAC, and PHY protocol layers of a base station. Certainly, the protocol layers of the CU and the DU may alternatively be divided in another manner in the base station. For example, the DU includes MAC and PHY protocol layers, and the CU includes RRC, SDAP, PDCP, and RLC protocol layers, or RRC, PDCP, and RLC protocol layers. This is not limited herein. The DU and a radio frequency system may be physically two parts of one communications device, so that the DU and the radio frequency system are integrated together. The DU and the CU may alternatively be physically used as parts belonging to one communications device, so that the DU and the CU are integrated together. Alternatively, a radio frequency system, the DU, and the CU may be physically used as parts belonging to one network node, so that the radio frequency system, the DU, and the CU may be integrated together.

Figure 8:
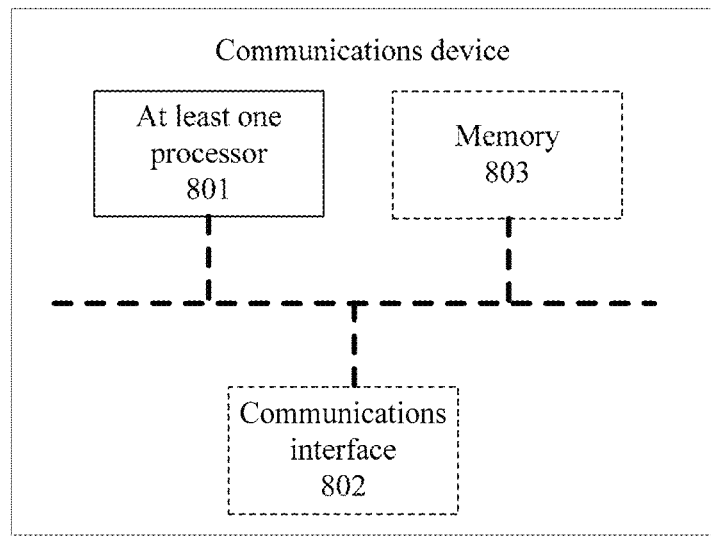
FIG. 8 is a schematic block diagram of a communications device according to an embodiment of this application.

It can be understood that for the UE, the CU, the DU, the CP, and the UP in the foregoing embodiments, a hardware platform with a processor and a communications interface may be used to execute a program instruction, to separately implement functions of the UE, the CU, the DU, the CP, and the UP in any design in the foregoing embodiments of this application. Based on this, as shown in FIG. 8, an embodiment of this application provides a schematic block diagram of a communications device 800. The communications device 800 includes at least one processor 801, and optionally includes a communications interface 802.

The communications interface is configured to support the communications device 800 in performing a communication interaction with another device; and when a program instruction is executed in the at least one processor 801, functions operated on any one of the following devices in any design of the foregoing embodiments of this application are implemented: the UE, the CU, the DU, the CP, and the UP. In an optional design, the communications device 800 may further include a memory 803, to store the program instruction necessary to implement the foregoing device functions and process data generated in a program execution process. Optionally, the communications device 800 may further include an internal interconnection line, to implement communication interactions between the at least one processor 801, the communications interface 802, and the memory 803. The at least one processor 801 may be considered to be implemented by using a special-purpose processing chip, a processing circuit, a processor, or a general-purpose chip. For example, in the embodiments, some or all of processing of PHY functions in the DU, or some or all of protocol communication functions on an F1 interface or an E1 interface may be implemented by using a special-purpose circuit/chip disposed in the at least one processor, and certainly, may be alternatively implemented by executing, by a general-purpose processor disposed in the at least one processor 801, a program instruction used to implement PHY functions or F1 interface or E1 interface communication functions. For another example, for some or all of processing of related functions at MAC layers, RLC layers, PDCP layers, SDAP layers, and RRC layers in the devices in the embodiments of this application, the at least one processor 801 may include a communication processing chip, to implement the processing by using program instructions used to implement the related functions at the MAC layers, the RLC layers, the PDCP layers, the SDAP layers, and the RRC layers. It can be understood that the methods, procedures, operations, or steps in various designs described in the embodiments of this application can be implemented in a one-to-one correspondence manner by using computer software, electronic hardware, or a combination of computer software and electronic hardware. Whether these functions are performed by using hardware or software depends on a specific application and a design constraint of a technical solution. For example, considering aspects such as good university, low costs, and software and hardware decoupling, the manner of executing the program instruction may be used for implementation. For another example, considering aspects such as system performance and reliability, the special-purpose circuit may be used for implementation. A person of ordinary skill in the art can use different methods to implement the described functions for each specific application. This is not limited herein.

The communications interface 802 usually has a function of exchanging information between two communications peers. For a case in which information is exchanged between the communications peers in a wired manner, the communications interface may be designed as an interface circuit or a hardware module including the interface circuit, so as to support a communication interaction performed between the communications peers in the wired manner. For example, for communication functions of the F1 interface between the DU and the CU and of the E1 interface between the CP and the UP in this application, this interface design may be used. For a case in which information is exchanged between the communications peers in a wireless manner, the communications interface may be an interface circuit with a radio frequency transceiving function, or a hardware system including the interface circuit with a radio frequency transceiving function. For example, when the DU and the UE perform wireless communication, this design may be used for a communications interface between the DU and the UE.

Optionally, for implementation of the CU, the DU, the CP, or the UP, a general-purpose hardware platform (having processing resources and storage resources) may alternatively be used to directly or indirectly execute implementation program instructions in related designs of the embodiments, to implement functions of the CU, the DU, the CP, or the UP in the designs of the embodiments of this application. An actual deployment may be: The CU, the CP, or the UP may be in proximity to a core network device, or may be deployed with a core network device in a collaborative manner, that is, physically, the CU, the CP, or the UP may be separated from a core network device or integrated with a core network device. The functions of the CU, the CP, or the UP may also be used as a part of the core network device.

An embodiment of this application further provides a computer program product. The computer program product includes a program instruction, and when the program instruction is directly or indirectly executed, for example, when the program instruction is executed in the communications device 800 in the foregoing embodiment, functions of any one of the following devices in any design of the embodiments of this application are implemented: the UE, the CU, the CP, the UP, and the DU. It can be understood that the program instruction may be stored in a computer readable storage medium or may be transmitted from a computer readable storage medium to another computer readable storage medium. For example, the program instruction may be transmitted from a website, computer, server, or data center to another website, computer, server, or data center in a wired (for example, a coaxial cable, an optical fiber, or a digital subscriber line) or wireless (for example, infrared, radio, or a microwave) manner. When the program instruction is executed, considering that a specific network device usually includes a hardware layer and an operating system layer and/or a medium layer running above the hardware layer, the program instruction related to the embodiments of this application is usually invoked and executed by software at a plurality of layers. Therefore, the program instruction may be an indirect execution process in a hardware device (a general-purpose processing circuit or a special-purpose processing circuit).

An embodiment of this application further provides a chip system. The chip system includes at least one processor, and when a program instruction is executed in the at least one processor, functions of any one of the following devices in any one of the first aspect and the designs of the first aspect are implemented: the UE, the CU, the DU, the CP, and the UP.

This application further provides the following embodiments. It should be noted that a numbering method of the following embodiments is not according to the numbering method of the foregoing embodiments.

In Embodiment 1, a communication method includes: sending, by a centralized unit, a paging message to a distributed unit, where the paging message carries indication information indicates that the paging is paging originated from a core network or the paging is paging originated from a radio access network, where the indication information is used to instruct the distributed unit to determine that the paging is paging originated from the core network or the paging is paging originated from the radio access network.

In Embodiment 2, the communication method according to Embodiment 1 includes: If the indication information is identity information of a paged terminal device that is originated from the core network, the indication information indicates that the paging is paging originated from the core network, and is used to instruct the distributed unit to determine that the paging is paging originated from the core network; or if the indication information is identity information of a paged terminal device configured by the radio access network, the indication information indicates that the paging is paging originated from the radio access network, and is used to instruct the distributed unit to determine that the paging is paging originated from the radio access network.

In Embodiment 3, in the communication method according to Embodiment 1, the paging message further includes identity information of a paged terminal device; and that the indication information indicates that the paging is paging originated from a core network or the paging is paging originated from a radio access network, and the indication information is used to instruct the distributed unit to determine that the paging is paging originated from the core network or the paging is paging originated from the radio access network includes: The indication information indicates that the paging is paging originated from the core network, and is used to instruct the distributed unit to determine that the paging is paging originated from the core network; or the indication information indicates that the paging is paging originated from the radio access network, and is used to instruct the distributed unit to determine that the paging is paging originated from the radio access network.

In Embodiment 4, in the communication method according to Embodiment 1, the paging message further includes identity information of a paged terminal device; and that the indication information indicates that the paging is paging originated from a core network or the paging is paging originated from a radio access network, and the indication information is used to instruct the distributed unit to determine that the paging is paging originated from the core network or the paging is paging originated from the radio access network includes: If the indication information indicates that identity information of a paged terminal device is originated from the core network, the indication information indicates that the paging is paging originated from the core network, and is used to instruct the distributed unit to determine that the paging is paging originated from the core network; or if the indication information indicates that identity information of a paged terminal device is configured by the radio access network, the indication information indicates that the paging is paging originated from the radio access network, and is used to instruct the distributed unit to determine that the paging is paging originated from the radio access network.

In Embodiment 5, in the communication method according to Embodiment 1, the indication information includes identity information of a paged terminal device that is originated from the core network or identity information of a paged terminal device configured by the radio access network; and when the indication information includes the identity information of a paged terminal device that is originated from the core network, the indication information indicates that the paging is paging originated from the core network, and is used to instruct the distributed unit to determine that the paging is paging originated from the core network; or when the indication information includes the identity information of a paged terminal device configured by the radio access network, the indication information indicates that the paging is paging originated from the radio access network, and is used to instruct the distributed unit to determine that the paging is paging originated from the radio access network.

In Embodiment 6, a communication method includes: receiving, by a distributed unit, a paging message from a centralized unit, where the paging message carries indication information indicates that the paging is paging originated from a core network or the paging is paging originated from a radio access network; and determining, by the distributed unit according to the indication information, that the paging is paging originated from the core network or the paging is paging originated from the radio access network.

In Embodiment 7, the communication method according to Embodiment 6 includes: If the indication information is identity information of a paged terminal device that is originated from the core network, the indication information indicates that the paging is paging originated from the core network, and the distributed unit determines, according to the indication information, that the paging is paging originated from the core network; or if the indication information is identity information of a paged terminal device configured by the radio access network, the indication information indicates that the paging is paging originated from the radio access network, and the distributed unit determines, according to the indication information, that the paging is paging originated from the radio access network.

In Embodiment 8, in the communication method according to Embodiment 6, the paging message further includes identity information of a paged terminal device; and that the indication information indicates that the paging is paging originated from a core network or the paging is paging originated from a radio access network, and the distributed unit determines, according to the indication information, that the paging is paging originated from the core network or the paging is paging originated from the radio access network includes: The indication information indicates that the paging is paging originated from the core network, and the distributed unit determines, according to the indication information, that the paging is paging originated from the core network; or the indication information indicates that the paging is paging originated from the radio access network, and the distributed unit determines, according to the indication information, that the paging is paging originated from the radio access network.

In Embodiment 9, in the communication method according to Embodiment 6, the paging message further includes identity information of a paged terminal device; and that the indication information indicates that the paging is paging originated from a core network or the paging is paging originated from a radio access network, and the distributed unit determines, according to the indication information, that the paging is paging originated from the core network or the paging is paging originated from the radio access network includes: If the indication information indicates that the identity information of a paged terminal device is originated from the core network, the indication information indicates that the paging is paging originated from the core network, and the distributed unit determines, according to the indication information, that the paging is paging originated from the core network; or if the indication information indicates that the identity information of a paged terminal device is configured by the radio access network, the indication information indicates that the paging is paging originated from the radio access network, and the distributed unit determines, according to the indication information, that the paging is paging originated from the radio access network.

In Embodiment 10, in the communication method according to Embodiment 6, the indication information includes identity information of a paged terminal device that is originated from the core network or identity information of a paged terminal device configured by the radio access network; and when the indication information includes the identity information of a paged terminal device that is originated from the core network, the indication information indicates that the paging is paging originated from the core network, and the distributed unit determines, according to the indication information, that the paging is paging originated from the core network; or when the indication information includes the identity information of a paged terminal device configured by the radio access network, the indication information indicates that the paging is paging originated from the radio access network, and the distributed unit determines, according to the indication information, that the paging is paging originated from the radio access network.

In Embodiment 11, a communication method includes: rejecting, by a centralized unit, an access request of a terminal device; and sending, by the centralized unit, indication information to a distributed unit, where the indication information indicates that the distributed unit needs to delete context information of the terminal device.

In Embodiment 12, in the communication method according to Embodiment 11, the indication information includes an indication of rejecting access of the terminal device and/or a cause of rejecting access of the terminal device.

In Embodiment 13, the communication method according to Embodiment 10 or 11 includes: receiving, by the centralized unit, a notification message sent from the distributed unit and indicates that access of the terminal device is allowed.

In Embodiment 14, a communication method includes: when an access request of a terminal device is rejected by a centralized unit,
  receiving, by a distributed unit, indication information sent from the centralized unit, where the indication information indicates that the distributed unit needs to delete context information of the terminal device.

In Embodiment 15, in the communication method according to Embodiment 14, the indication information includes an indication of rejecting access of the terminal device and/or a cause of rejecting access of the terminal device.

In Embodiment 16, the communication method according to Embodiment 14 or 15 includes: sending, by the distributed unit to the centralized unit, a notification message indicates that access of the terminal device is allowed.

In Embodiment 17, in the communication method according to any one of Embodiments 1 to 16, the distributed unit includes at least one of the following: a Radio Link Control layer, a Media Access Control layer, and a physical layer; the centralized unit includes at least one of the following: a Radio Resource Control layer, a Service Data Adaptation Protocol layer, and a Packet Data Convergence Protocol layer; and the distributed unit and the centralized unit are included in a radio access network or are included in a single base station.

In Embodiment 18, a communications device is provided, where the communications device includes at least one processor and a communications interface, the communications interface is configured for information exchange between the communications device and another communications device, and when a program instruction is executed in the at least one processor, the communications device implements functions of any one of the following devices in the method according to any one of Embodiments 1 to 17: the distributed unit and the centralized unit.

In Embodiment 19, a computer program storage medium is provided, where the computer program storage medium includes a program instruction, and when the program instruction is directly or indirectly executed, functions of any one of the following devices in the method according to any one of Embodiments 1 to 17 are implemented: the distributed unit and the centralized unit.

In Embodiment 20, a chip system is provided, where the chip system includes at least one processor, and when a program instruction is executed in the at least one processor, functions of any one of the following devices in the method according to any one of Embodiments 1 to 17 are implemented: the distributed unit and the centralized unit.

In Embodiment 21, a communications system is provided, where the communications system includes the communications device according to Embodiment 18.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method implemented for a centralized unit, comprising:
   determining whether a paging of a paged terminal device is originated from a core network node or from a radio access network node, wherein the radio access network node is a base station;
   setting indication information based on the determining whether the paging of the paged terminal device is originated from the core network node or from the radio access network node, wherein the indication information is set to be identity information that is originated from the core network node when the paging is originated from the core network node, or the indication information is set to be identity information that is generated by the radio access network node when the paging is originated from the radio access network node;
   in response to at least determining that the paging is originated from the radio access network node, sending, by the centralized unit to a distributed unit over an F1 interface, a paging message, wherein the paging message carries the indication information that indicates that the paging is originated from the radio access network node, and wherein the indication information is set to identity information that is generated by the radio access network node, and wherein the centralized unit and the distributed unit are included in the base station.

2. The communication method according to claim 1, wherein the indication information is sent by the distributed unit to the paged terminal device.

3. An apparatus, comprising:
   at least one processor, and a non-transitory memory storing instructions for execution by the at least one processor;
   wherein, when executed, the instructions cause the apparatus to perform operations comprising:

determining whether a paging of a paged terminal device is originated from a core network node or from a radio access network node, wherein the radio access network node is a base station;

setting indication information based on the determining whether the paging of the paged terminal device is originated from the core network node or from the radio access network node, wherein the indication information is set to be identity information that is originated from the core network node when the paging is originated from the core network node, or the indication information is set to be identity information that is generated by the radio access network node when the paging is originated from the radio access network node;

in response to at least determining that the paging is originated from the radio access network node, sending, by a centralized unit to a distributed unit over an F1 interface, a paging message, wherein the paging message carries the indication information that indicates that the paging is originated from the radio access network node, and wherein the indication information is set to identity information that is generated by the radio access network node, and wherein the centralized unit and the distributed unit are included in the base station.

4. The apparatus according to claim 3, wherein the indication information is sent by the distributed unit to the paged terminal device.

5. A communication system, comprising:
a centralized unit and a distributed unit, wherein the centralized unit and the distributed unit are included in a base station, and wherein:
the centralized unit is configured to:
determine whether a paging of a paged terminal device is originated from a core network node or from a radio access network node, wherein the radio access network node is the base station;
set indication information based on the determination, wherein the indication information is set to be identity information that is originated from the core network node when the paging is originated from the core network node, or the indication information is set to be identity information that is generated by the radio access network node when the paging is originated from the radio access network node;

in response to at least determining that the paging is originated from the radio access network node, send, to the distributed unit over an F1 interface, a paging message, wherein the paging message carries the indication information that indicates that the paging is originated from the radio access network node;

the distributed unit is configured to:
determine, according to the indication information, that the paging is originated from the radio access network node, and the indication information is set to identity information that is generated by the radio access network node; and
send the indication information to the paged terminal device.

6. The communication system according to claim 5, wherein the indication information comprises an identity of the paged terminal device configured by the radio access network node.

7. The communication method according to claim 1, wherein the centralized unit comprises at least one of the following: a Radio Resource Control layer, a Service Data Adaptation Protocol layer, or a Packet Data Convergence Protocol layer; and
the distributed unit comprises at least one of the following: a Radio Link Control layer, a Media Access Control layer, or a physical layer.

8. The communication method according to claim 1, wherein the setting indication information comprises:
setting the indication information based on two information elements, one information element of the two information elements is used to carry the identity information of the paged terminal device that is originated from the core network node, and the other information element of the two information elements is used to carry the identity information of the paged terminal device configured by the radio access network node.

\* \* \* \* \*